United States Patent [19]

Foster

[11] Patent Number: 4,580,678
[45] Date of Patent: Apr. 8, 1986

[54] RECIPROCATING FLOOR CONVEYOR SYSTEM

[76] Inventor: Raymond K. Foster, P.O. Box 1, Madras, Oreg. 97741

[21] Appl. No.: 680,356

[22] Filed: Dec. 11, 1984

[51] Int. Cl.[4] .............................................. B65G 25/04
[52] U.S. Cl. .................................... 198/750; 198/751; 198/775; 414/525 R
[58] Field of Search ............... 198/750, 775, 648, 850, 198/851, 853, 751; 414/525 B, 525 R, 509

[56] References Cited

U.S. PATENT DOCUMENTS

| 3,534,875 | 10/1970 | Hallstrom, Jr. ....................... | 198/750 |
| 4,143,760 | 3/1979 | Hallstrom ............................ | 198/750 |
| 4,144,963 | 3/1979 | Hallstrom ............................ | 198/750 |

FOREIGN PATENT DOCUMENTS 1296087  5/1969  Fed. Rep. of Germany ...... 198/750

Primary Examiner—Joseph E. Valenza
Assistant Examiner—Daniel R. Alexander
Attorney, Agent, or Firm—Delbert J. Barnard

[57] ABSTRACT

A group of six floor slat members (FS1–FS6) are staggered in position relative to each other. Each is first advanced and then returned by a linear hydraulic motor (M1–M6). Each motor (M1–M6) is provided with a two position directional valve (DV1–DV6). A mechanical connection (56, 58, 60, 62, 66, 68) is provided between one floor slat member (FS1) and a pilot valve (PV1) for the directional valve (DV1), for the motor (M1), and for the first floor slat member (FS1). This mechanical connection and the pilot valve (PV1) function to switch the position of directional valve (DV1) at the end of each advance and return stroke of the floor member (FS1). During the return stroke, the motor (M1) is connected to a pump (P2) designed to return the floor slat member (FS1) within the same amount of time as the floor slat members (FS1–FS6) advance a distance equal to the stagger distance. During its advance, the first floor slat member (FS1) moves an operator (56, 30, 31, 32) of a pilot valve (PV2) and as such operator moves it functions to successively communicate pressure to the directional valves (DV2–DV6) for the remaining floor slat members (FS2–FS6). Delivery of pressure fluid to a directional valve (DV2–DV6) operates to shift the valve in position, from its advanced position to its return position. This occurs substantially at the end of the advance stroke of each floor slat member (FS2–FS6).

15 Claims, 11 Drawing Figures

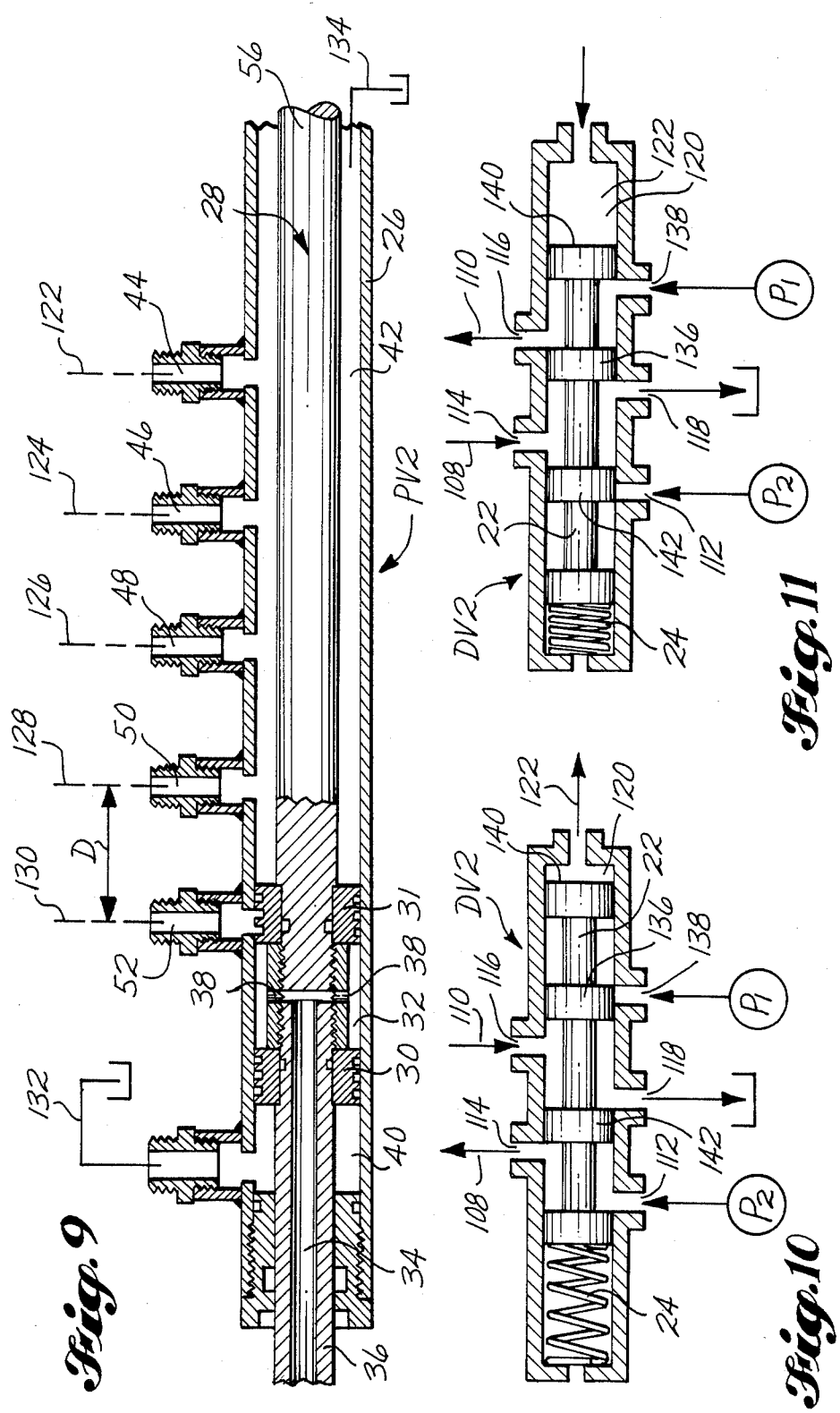

RECIPROCATING FLOOR CONVEYOR SYSTEM

DESCRIPTION

1. Technical Field

This invention relates to continuous movement type reciprocating floor conveyors, and in particular to an improved drive system for the floor members.

2. Background Art

Hydraulic fluid control systems for reciprocating floor conveyors are disclosed by U.S. Pat. No. 4,143,760, granted Mar. 13, 1979, and by U.S. Pat. No. 4,144,963, granted Mar. 20, 1979, both to Olaf A. Hallstrom.

The system disclosed by U.S. Pat. No. 4,143,760 operates to advance all of the floor slats together, from a common start position to a common advanced position. Then, the floor slat members are stopped at the advanced position, and each one of the group is then returned one at a time. After all of the slat members have been returned to the start position, the operation is repeated.

U.S. Pat. No. 4,144,963 discloses a reciprocating floor conveyor comprising four floor members per group. The floor members for each group are staggered in position between start and advanced positions. Three of the floor members are always advancing and the fourth is returning. A motor driven rotary valve is provided for sequencing fluid to hydraulic cylinders provided for driving the floor members.

The principal object of the present invention is to provide a simple but effective drive system for a continuous movement type reciprocating floor conveyor.

DISCLOSURE OF THE INVENTION

The drive system of the present invention is basically characterized by two separate sources of hydraulic pressure, one for advancing the floor slat members and another for retracting the floor slat members.

In basic form, the drive system comprises a separate double-acting hydraulic motor connected to each floor slat member. Each hydraulic motor includes a piston head and first and second variable volume chambers on opposite sides of the piston head. A separate direction valve is associated with each hydraulic motor. Each direction valve has a first position in which the first source of hydraulic pressure is connected to the first chamber of its hydraulic motor and the second chamber is connected to return pressure, and the floor slat member is advancing, and a second position in which the second source of hydraulic pressure is connected to the second chamber of said hydraulic motor, the first chamber is connected to return pressure, and the floor slat member is returning. The control means further includes means for moving each directional valve from its first position to its second position substantially when its floor slat member has become fully advanced, and for moving each direction valve from its second position back to its first position substantially when its floor member has become fully returned.

In preferred form, a first of the floor slat members is provided with means responsive to such floor slat member reaching each end position of travel, for switching its direction valve from one position to the other.

Preferably also, a moving piston portion of a pilot valve is connected to move with the first floor slat member. Each of the direction valves for the remaining floor slat members is spring biased into its first position, and is movable from its first to its second position by fluid pressure acting on a movable valve spool in opposition to the spring force. The fluid pressure ends of these directional valves are always connected to return when the first floor slat member is returning, so that during the return stroke of the first floor slat member the remaining floor slat members are always advancing. During the advance stroke of the first floor slat member, the piston member functions to sequentially deliver pulses of fluid pressure to the fluid end of the direction valves for the other floor slat members. In this manner, the delivery of a pulse of fluid pressure to a directional valve, for switching it in position for causing its floor slat member to return, is dependent on the position of the first floor slat member.

In preferred form, the piston member is provided with two piston heads which are spaced apart to define a pressure chamber between them. A fluid passageway is provided in the piston member. During return movement of the first floor slat member, the fluid passageway is connected to return, so that the chamber between the two piston heads will also be connected to return. The two piston heads travel within a cylinder having a plurality of side ports and two end ports. The two end ports are always connected to return.

Throughout the advance stroke of the first floor slat member the fluid passageway in the piston rod, and the chamber between the two piston heads, are connected to fluid pressure. The ports and the chamber between the piston heads are so positioned that following an initial step of advance of the first floor slat member, substantially equal to an increment of stagger, the fluid chamber between the two piston heads comes into registry with a first side port which communicates with a first conduit leading to the pressure fluid end of the direction valve for the second floor slat member. During the interval of time that the chamber between the two piston heads is in communication with the first port, fluid pressure is communicated via the first port and the conduit to the pressure fluid end of the direction valve for the second floor slat member. This causes movement of the direction valve from its first to its second position, resulting in a connection of the second source of hydraulic pressure to the return chamber of the hydraulic motor for the second floor slat member, and a connection of the advance chamber to return, so that the second floor slat member will be turned at a fast rate of speed. Substantially, simultaneously with the second floor slat member reaching its return position, the advance movement of the first floor slat member will move the piston rod and the chamber between the piston heads from a position of registry with the first side port to a position of registry with the second side port. As soon as the trailing piston head uncovers the first side port, the fluid pressure end of the direction valve for the second slat member will be connected to return. The spring will return the direction valve to its first position and the second floor slat member will start a new advance stroke. Communication of the chamber between the two piston heads with the second port will result in a fluid pressure pulse being delivered to the direction valve for the third floor slat member, for switching it in position to cause a return stroke of the third floor slat member. This pattern of operation continues until the fluid chamber between the two piston heads has been moved into and then out from registry with each of the side ports, and the first floor slat member and the piston rod have again reached their advanced positions. Then, they are returned and the entire sequence of operation starts over.

In preferred form, a mechanical arm traveling with the first floor slat member operates at the ends of movement of the first floor slat member to switch in position a pilot valve which operates to send pressure signals for switching in position the direction valve associated with the hydraulic motor for the first floor slat member. This pilot valve also may serve to connect the passageway in the piston rod to return when the first floor slat member is returning, and to a source of fluid pressure when the first floor slat member is advancing.

Other objects, features and advantages of the invention are disclosed in the Best Mode for Carrying Out the Invention, and in the appended claims. The Best Mode for Carrying Out the Invention and the appended claims constitute portions of the Disclosure of the Invention.

BRIEF DESCRIPTION OF THE DRAWINGS

Like reference characters are used to designate like parts throughout the several views of the drawing, and:

FIG. 9 is a fragmentary longitudinal sectional view of a multiported pilot valve which is connected to the first floor slat member and which operates in response to the position of the first floor slat member to control the flow of hydraulic fluid pressure to direction valves associated with the hydraulic linear motors for the other floor slat members;

FIG. 10 is an enlarged scale longitudinal sectional view of a schematic showing of a direction valve of the type used with all of the floor slat members except for the first floor slat member, such view showing the direction valve in its first position; and FIG. 11 is a view like FIG. 10, but showing the direction valve in its second position.

BEST MODE FOR CARRYING OUT THE INVENTION

By way of typical and therefore nonlimitive example, the embodiment that is illustrated comprises six floor slat members. In a given installation, this group of six floor slat members may be repeated enough times to give the floor its desired width. For example, a given floor may be twenty-four floor slat members wide. In such a floor the group of six floor slat members would be multiplied four times. Also, the number of floor slat members in a group can vary. For example, it might be sometimes desired to have only three floor slat members in each group. Or it may be desired to have more than six floor slat members in the group. Accordingly, both the number of floor slat members in the group, and the number of groups, can vary from one installation to another.

Figure 5:
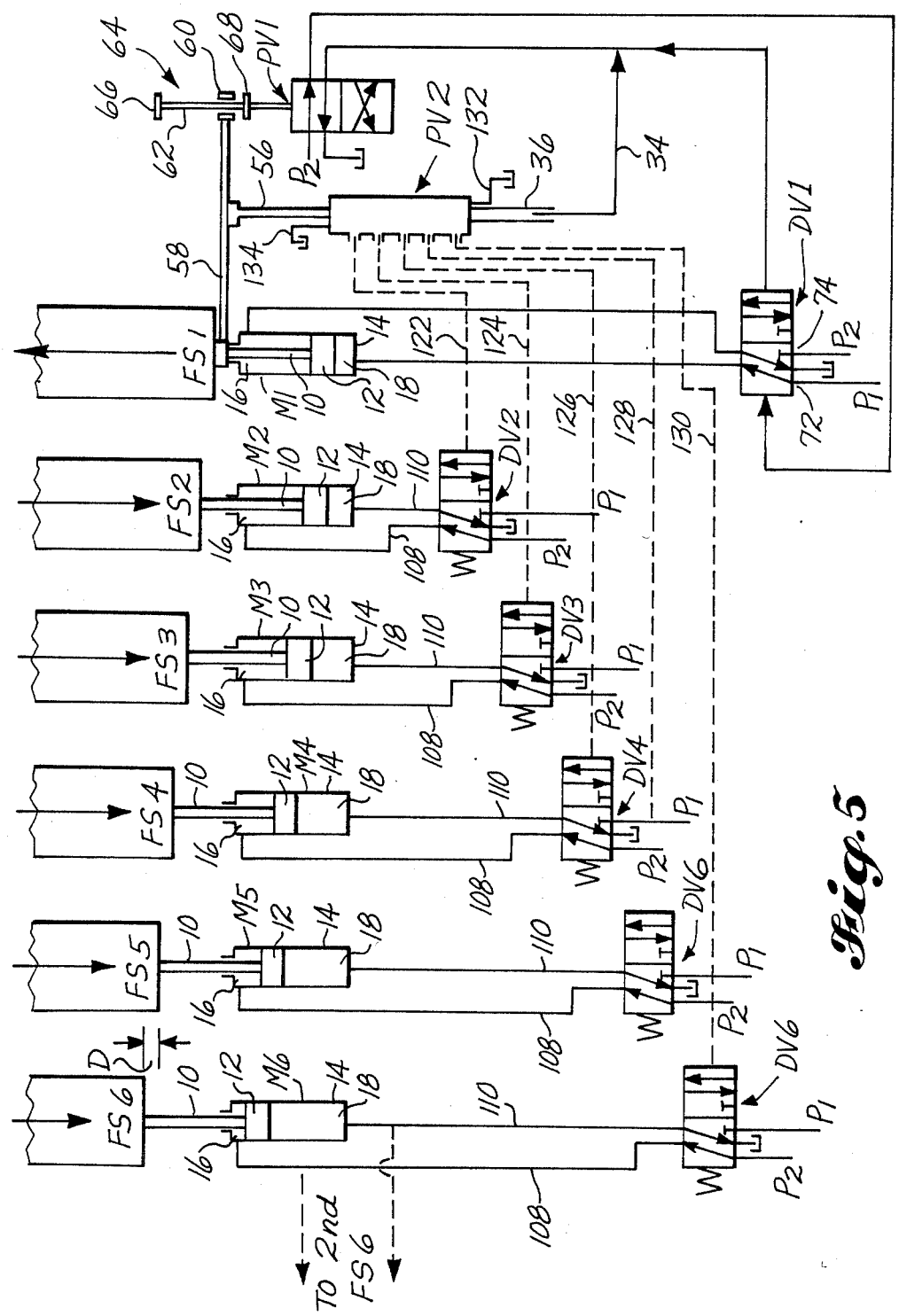
FIG. 5 is a schematic diagram of an embodiment of the control system of the present invention, showing a first floor slat member substantially immediately after it has fully advanced and has reversed its direction and is starting its return movement, while the other floor slat members are still advancing.
Figure 6:
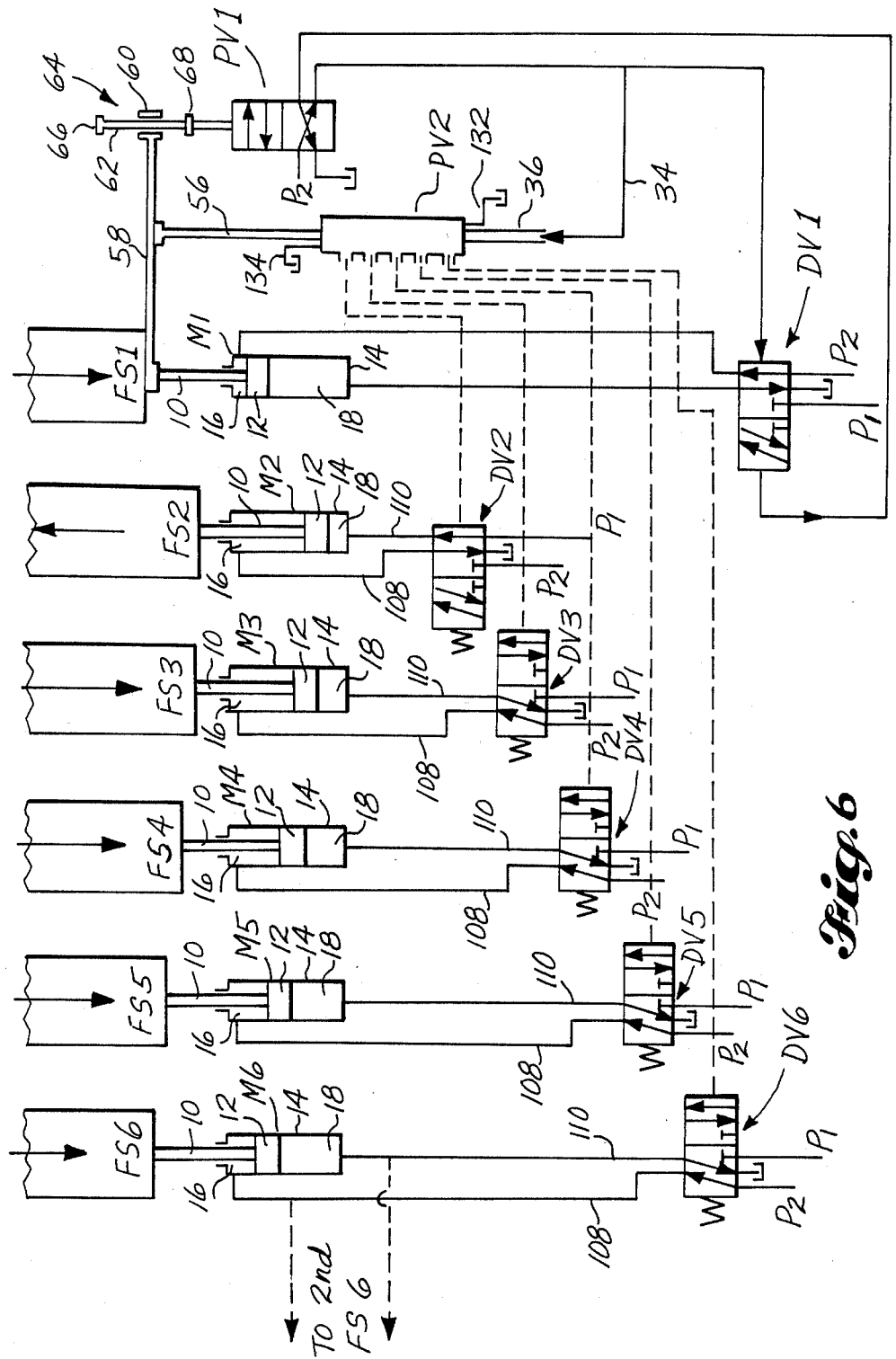
FIG. 6 is a schematic diagram like FIG. 5, but showing the condition of the system substantially immediately after the second floor slat member has become fully advanced and has reversed its direction of travel and is starting its return movement, while the other floor slat members are advancing.

If it is desired to add or substract floor slat members from a group, this can easily be done by either adding to or subtracting from the control system shown by FIGS. 5 and 6, one or more floor slat members and a hydraulic linear motor and a direction valve for each such hydraulic linear motor. A change would also have to be made in the number of ports in a pilot valve for the second through last members of the group of floor slat members, to be described below. Adding group multiples of the floor slat members can be done by merely branching the hydraulic fluid delivery and return lines on the hydraulic linear motor side of each direction valve. This modification is indicated in FIG. 5 in connection with the hydraulic supply and return lines for the linear hydraulic motor associated with floor slat member 6.

FIGS. 1-4 show a single group of six floor slat members. By way of example, let it be assumed that the six floor slat members that are illustrated are one group of a floor which is several groups wide.

Figure 1:
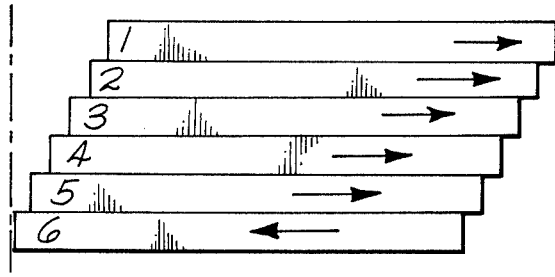
FIGS. 1-4 are sequence of operation views, showing a group of six floor slat members staggered in position between start and advanced positions, and showing that five of the floor slat members are always advancing while the sixth floor slat member is retracting at a higher rate of speed.
Figure 2:
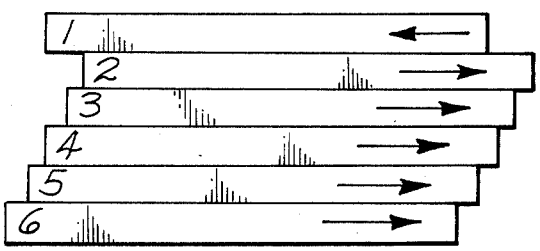
Figure 3:
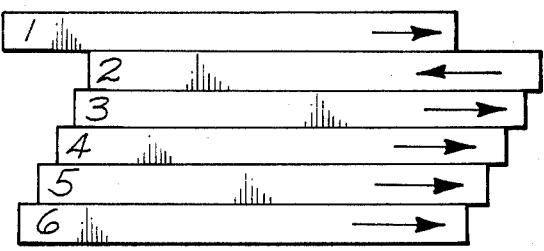
Figure 4:
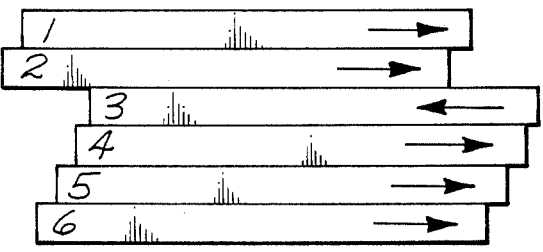

FIGS. 1-4 show that the floor slat members of each group are always staggered in position relative to each other. Each floor slat member "1"-"6" has a start position and advance position. FIG. 1 shows floor slat members "1"-"5" traveling together towards the advance position. Floor slat member "6" is traveling in the reverse direction and is just about to reach its start position. FIG. 2 shows floor slat members "2"-"6" advancing and floor slat member "1" retracting. FIG. 3 shows floor slat members "1" and "3"-"6" advancing and floor slat member "2" retracting. FIG. 4 shows floor slat members "1", "2" and "4"-"6" advancing and floor slat member "3" retracting. This pattern of movement of the floor slat members "1"-"6" is repeated throughout the entire operation of the reciprocating floor conveyor. In order for this pattern of movement to work, the floor slat members must be returned at a faster rate of speed then they are advanced. More specifically, each floor slat member must be fully retracted in the same amount of time that it takes such floor slat member to advance through a distance equal to the increment of stagger from one floor slat member to the next. The control system of the present invention achieves this control in a very simple and positive manner.

The six floor slat members in the illustrated embodiment of the invention are designated FS1-FS6. A separate linear fluid motor M1-M6 is associated with each floor slat member FS1-FS6. In the illustrated embodiment, the piston rod 10 of each fluid motor M1-M6 is directly connected to a floor slat member FS1-FS6 with which it is associated. Each piston includes a piston head 12 which divides the interior of the motor chamber or cylinder 14 into two variable volume chambers. Herein these chambers are termed the advance chamber 16 and the return chamber 18. These chambers 16, 18 are so named because fluid introduction into the chambers 16 and fluid removal from the chambers 18 cause a movement of the floor slat members FS1–FS6 in the advancing direction. Fluid introduction into the chambers 18 together with fluid removal from the chamber 16 causes movement of the floor slat members FS1–FS6 in the opposite or return direction. Of course, in other embodiments, the advance and reverse directions could be the reverse of what is illustrated. Also, it may be desired in some embodiments to make the floor reversible in operation. In other words, the floor may be used to advance a load in one direction. Then, it may be reversed and used to advance the same or another load in the opposite direction.

The control system of the invention also comprises a direction valve associated with each cylinder. These direction valves are designated DV1–DV6. Each of the direction valves DV1–DV6 is a two position valve. Direction valve DV1 is different from the direction valves DV2–DV6 in that it is moved in both directions by fluid pressure. Direction valve DV1 has a fluid chamber at each of its ends. As will hereinafter be described in detail, fluid pressure is introduced against one end and removed from the other to cause movement of the valve spool 20. The direction valves DV2–DV6 each includes a spool 22 which is spring biased into one of its positions by means of a coil spring 24. As will hereinafter be described, fluid pressure is introduced against the opposite end of the valve spool 22, to move it against the force of the spring into its second position.

The system of the present invention includes a pilot valve PV1 that is connected with direction valve DV1. Valve PV1 is a two position valve. It is mechanically coupled to the moving element of the motor M1 for the first floor slat member FS1, in such a manner that each time the floor slat FS1 reaches the end of travel in each direction the valve PV1 is switched in position.

The system further includes a single multiported pilot valve PV2 which controls fluid pressure communication with the directional valves DV2–DV6. Referring to FIG. 9, pilot valve PV2 comprises a tubular cylinder or housing 26 in which a piston rod 28 travels. Piston rod 28 includes two piston heads 30 between which is defined an annular fluid chamber 32. A central passageway 34 in the end portion 36 of piston rod 28 communicates with annular chamber 32 via radial ports 38.

The end portions 40, 42 of the interior of housing 26, endwise outwardly from the piston heads 30, 31, are connected to return. Chamber 26 is provided with a plurality of side ports 44, 46, 48, 50, 52, 54. These ports 44, 46, 48, 50, 52, 54 are spaced apart a distance D that is substantially equal to the stagger distance between adjacent floor slat members. The end portion 56 of piston member 28 is mechanically connected to the piston rod 10 of motor M1, so that piston member 26 is positioned in response to the position of floor slat member FS1.

By way of typical and therefore nonlimitive example, a mechanical arm 58 may extend laterally from piston rod 10 of motor M1. The end of arm 58 opposite the piston rod 10 may comprise an annular ring 60 which surrounds a portion 62 of a control rod operator 64 for the pilot valve PV1. A pair of stop members 66, 68 are secured to the member 62 at axially spaced apart locations.

Figure 7:
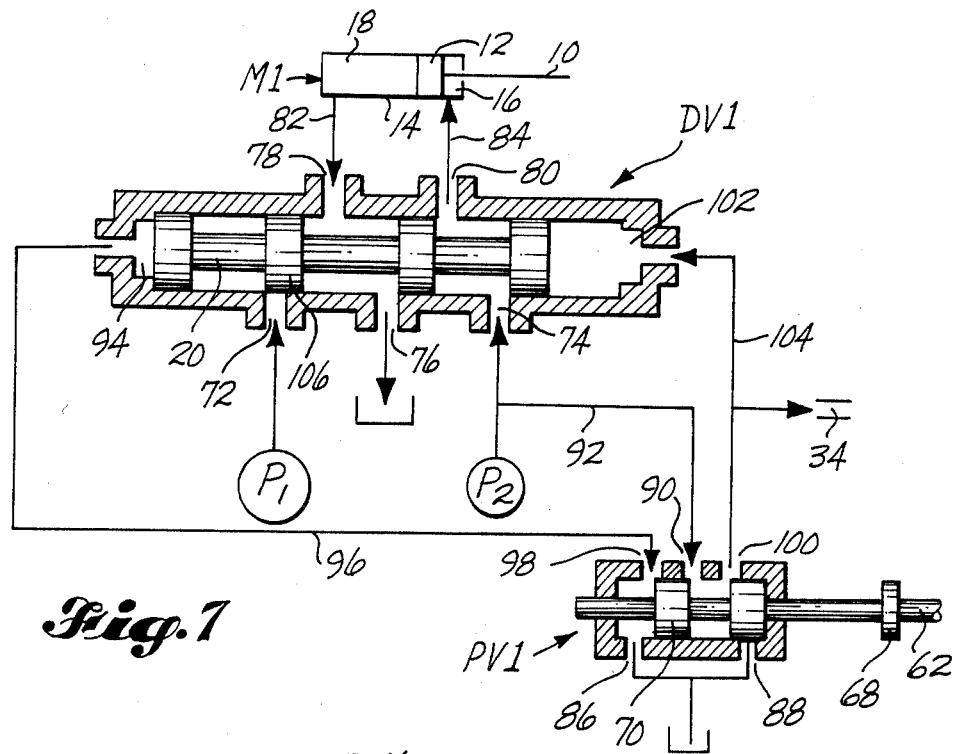
FIG. 7 is an enlarged scale sectional view of a direction valve associated with the linear hydraulic motor for the first floor slat member, and a two position pilot valve for such direction valve which is coupled to the first floor slat member so that it is switched from one position to the other at the end of each movement of the first floor slat member, such view showing the two valves in their respective first positions.
Figure 8:
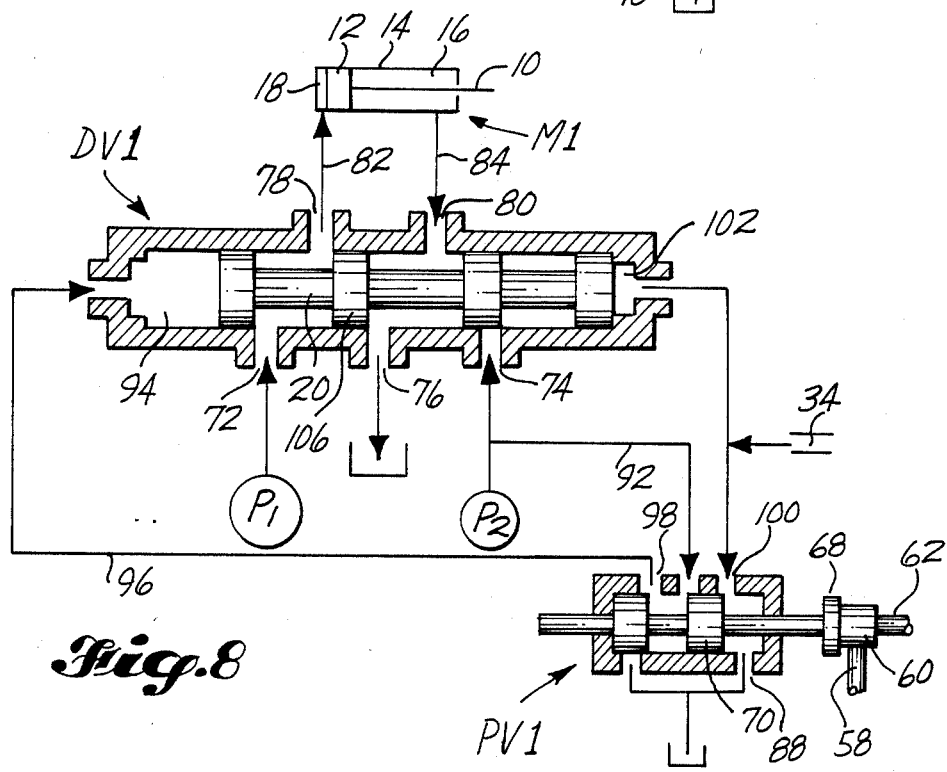
FIG. 8 is a view like FIG. 7, showing the pilot valve and the direction valve for the first floor slat member in their respective second positions.

Shortly before motor M1 is fully retracted (and floor slat member FS1 is fully advanced) the ring 60 contacts stop 68 and moves the spool 70 of valve PV1 into the position shown by FIGS. 5 and 8. Then, shortly before motor M1 is fully extended (and shortly before floor slat member FS1 reaches its return position) the ring 60 contacts stop 66, so that the remaining movement of motor M1 will operate to switch valve spool 70 in position from the position shown by FIGS. 5 and 8 to the position shown by FIGS. 6 and 7.

In accordance with an aspect of the invention, the control system is provided with two pumps P1, P2. The flow from P1 is directed into the advance chambers 16 of the motors M1–M6. In the illustrated embodiment, hydraulic fluid pressure from pump P1 is always in communication with five of the six advance chambers 16. The second pump P2 is only connected to the single return chamber 18 which is operating at any particular point of time. The capacities of the pumps P1 and P2 are chosen such that each floor slat member FS1–FS6 will be returned at the speed necessary to allow the entire turn stroke to occur within the same length of time that the other floor slat members FS1–FS6 are advancing an amount equal to the stagger distance D. In the illustrated embodiment, the return speed of a floor slat member FS1–FS6 is substantially five times faster than its advance speed.

As shown by FIGS. 5–8, direction valve DV1 has a pair of inlet ports 72, 74. Pump P1 is connected to inlet port 72 and pump P2 is connected to inlet port 74. Valve DV1 also includes a return port 76 and a pair of cylinder ports 78, 80 (FIGS. 7 and 8). A conduit 82 connects cylinder port 78 with chamber 18 of motor M1. A conduit 84 connects cylinder port 80 with chamber 16 of motor M1.

Pilot valve PV1 includes two return ports 86, 88. It includes one pressure port 90 which is connected via a conduit 92 to the output of pump P2. One end chamber 94 of valve DV1 is connected via a conduit 96 to port 98 in valve PV1. A port 100 in valve PV1 is connected to chamber 102 at the opposite end of valve DV1 via a conduit 104.

When pilot valve PV1 is in the position shown by FIGS. 6 and 7, the valve spool 70 is positioned to direct fluid pressure from port 90 through port 100 and conduit 104 into chamber 102. Chamber 94 is vented via conduit 96, port 98 and port 86 to the return. The pressure differential acting on valve spool 20 moves it into the position shown by FIGS. 6 and 7. In this position a land 106 blocks flow into the valve from pump P1. Flow from pump P2 enters port 74 and is directed to port 80, to conduit 84, and into chamber 16 of motor M1. Chamber 18 of motor M1 is vented to return via conduit 82, port 78 and port 76.

Referring now to FIGS. 5 and 8, movement of piston rod 10 of motor M1 in the advance direction of floor slat member FS1 causes the movement of ring member 60 against stop member 68 shortly before the end of travel of the piston rod 10. Following contact between ring 60 and stop member 68, further movement of piston rod 10 causes a shift in position of the control spool 70 of pivot valve PV2. It is moved from the position shown by FIGS. 6 and 7 into the position shown by FIGS. 5 and 8. This switch in position of control member 70 causes chamber 102 of valve DV1 to be vented through valve PV2 via port 100 and port 88. It also causes fluid pressure in conduit 92 to be directed via port 98, conduit 96 into chamber 94 in valve DV1. This pressure in chamber 94 causes endwise movement of valve spool 20 into the position shown by FIGS. 5 and 8. When in this position, valve spool 20 blocks flow from pump P2 into port 74. It also directs flow from pump PV1 through port 72 and port 78 into conduit 82 and return chamber 18 of motor M1. At the same time the advance chamber 16 of motor M1 is in communication with return via conduit 84, port 80 and port 76.

As earlier mentioned, direction valves DV2–DV6 each includes a spring 24 which biases each valve spool 22 into a position allowing flow from the pump P2 through the valve while blocking flow from pump P. In such position, fluid pressure from pump P2 enters port 112 and leaves port 114 via conduit 108 to the advance chamber 16 of its motor M2–M6. At the same time, return chamber 18 of the motor is communicated by a conduit 110, port 112 and port 114 to return.

A fluid chamber 120 is formed in the valve housing opposite the spring 24. This chamber 120 is connected to one end of a conduit which extends from the valve housing over to one of the side ports and pilot valve PV2. In FIGS. 5 and 9–11 these conduits are designated 122, 124, 126, 128 and 130.

When pilot valve PV1 is in the position shown by FIG. 6, fluid pressure from pumps P2 is always within passageway 34 and passageway 36 of pilot valve PV2. This fluid pressure is communicated via ports 38 so that such fluid pressure always exists in annular chamber 36. Endwise movement of the rod 56 is used to control the position of the annular chamber 32 with respect to the various ports 44, 46, 48, 50, 52. When a given port 44, 46, 48, 50, 52 is not in communication with the pressurized annular chamber 32, it is in communication with return via one of the return conduits 132, 134.

FIG. 10 shows chamber 120 in communication with return. As earlier described, this results in the force of spring 24 biasing the valve spool 22 into the position shown by FIG. 10. When in this position, the land 136 blocks port 138. Flow is from pump P2 through port 112, through the valve, then through port 114, and through passageway 108 into the chamber 16 of motor M1. Chamber 18 of motor M1 is vented to return via conduit 110, port 116, the interior of valve DV2, and port 118.

When the pressurized annular chamber 32 is in communication with port 44, the pressure in chamber 32 is communicated via port 44 and conduit 122 to the chamber 120 in valve DV2. This pressure creates a force against the end surface 140 of valve spool 22 which is larger than the spring force. As a result, valve spool 22 moves to the left, compressing the spring, until it is in the position shown in FIG. 11. When in this position, land 142 of valve member 22 blocks port 112. Port 138 is open and there is flow from pump P1 through port 138, through the interior of the valve, then through port 116 and passageway 110 into return chamber 18 of motor M2. At the same time, chamber 16 of motor M2 is vented to return via conduit 108, port 113, the interior of valve DV2, and port 118. So long as chamber 18 is pressurized and chamber 16 is vented, the motor M2 and the floor slat member FS2 connected thereto are both going through a return stroke. As earlier mentioned, this return stroke occurs at a speed that is about five times faster than the advanced speed of the cylinders and the floor members FS1–FS6 attached thereto. This is because pump P1 is being directed to a single chamber 18, and the flow rates and pressure levels of the pumps P1, P2 are chosen so that this speed difference will occur.

Referring to FIG. 5, this view shows the system in its condition substantially immediately after floor slat member FS1 has reached its fully advanced position, and by contact at 60, 68 has triggered the pilot valve PV1, placing it in the position shown by FIGS. 5 and 8. Annular chamber 32 is vented via conduit 34 and ports 100, 88 in valve DV1. The switch in position of valve PV1 has communicated pressure to chamber 44 in valve DV1, positioning valve spool 20 into the position shown by FIG. 8. Pump P1 is communicated via port 72, the interior of valve DV1, port 78, and conduit 82 with the return chamber 18 of motor M1. At the same time, advance chamber 16 of motor M1 is communicated via conduit 84, port 80, the interior of valve DV1, and port 76 with return. In response, the motor M1 and the floor slat member 1 attached thereto both move in the return direction. As they move, the control rod 56 moves and the annular chamber 32 is successively moved past the ports 52, 50, 48, 46, 44. However, since chamber 32 is in communication with return, this movement of chamber 32 past the ports 52, 50, 48, 46, 44 makes no changes in the valves DV2–DV6. They are still biased to the right (as pictured) by operation of the springs 24. Thus, each valve DV2–DV6 is in a position in which the pump P2 is communicated with the advanced chamber 16 of its motor and the return chamber 18 of its motor is connected to return.

Owing to the design and selection of the pumps P1, P2, at about the time floor slat member 1 is fully retracted, floor slat member 2 is at its fully advanced position. Final retraction of motor M1 causes, via mechanical element 60, 62, 66, a switch in the position of pilot valve PV1 from the position shown by FIGS. 5 and 8 to the position shown by FIGS. 6 and 7. This change in position of pilot valve PV1 causes a change in position of direction valve DV1. It also causes pressure fluid from pilot valve PV1 to be directed into passageway 34 of control rod 36, and from passageway 34, through ports 38 into annular chamber 32. The reversal in position of direction valve DV1 also causes another reversal in the direction of movement of floor slat member 1. Pressure from pump P2 is once again connected to advance chamber 16 and return chamber 18 is again connected to return. As floor slat member FS1 advances, the annular chamber 32 is moved first into communication with port 44, then port 46, then port 48, then port 50, and then port 52. However, this time there is pressure in chamber 32, and as chamber 32 makes communication with a given port 44, 46, 48, 50, 52, the fluid pressure is transmitted through the conduits 122, 124, 126, 128, 130 to the fluid chambers at the ends of direction valves DV2–DV6 which are opposite the springs 24. FIG. 11 shows the situation which exists at valve DV2 when floor slat member 1 is advancing and annular chamber 32 is in communication with port 44. Fluid pressure in chamber 42 is connected via port 44 and conduit 122 with chamber 120.

The fluid in chamber 120 exerts an endwise force on end surface 140 of valve spool 22 which is larger than the force of spring 24. As a result, the valve spool 22 is moved into the position shown by FIG. 11. As previously explained, fluid pressure from pump P1 is communicated via port 138, the interior of valve DV2, port 116 and passageway 110 into the return chamber 18 of motor M2. At the same time, the advance chamber 16 of motor M2 is communicated via passageway 108, port 114, the interior of valve DV2, and port 118 to return.

Direction valve DV2 stays in the position shown by FIG. 1 until the annular chamber 32 has moved past port 44. Specifically, this involves piston 31 first moving into blocking communication with port 44. Then, as piston 31 moves past port 44, port 44 and conduit 122 are communicated with return via space 42 and conduit 134.

Pressurized chamber 132 is next moved into communication with port 46, and then port 48, and then 50 and then port 52. At each time, the operation described above with respect to directional valve DV2 is repeated successively with each of the directional valves DV2–DV6.

In some installations, it may be preferred to combine the functions of pilot valve PV1 and direction valve DV1 into a single valve controlled by the mechanical element 60, 62, 66, 68. Also, it may be desirable to place the mechanical interconnection 58, 56 with a different but equivalent performing mechanical connection. For example, a rack may be attached to move with floor slat member FS1. A pinion gear may be positioned to be rotated by such rack. A second rack may be positioned to be operated by the pinion gear, for moving control rod 28.

It is to be understood that the valves which have been illustrated are functional schematics of valves and that the actual valves used may be of a different construction. It is to be understood that the above description is for purposes of illustration and not limitation. I am to only be limited by the claims which follow, and by the rules of claim interpretation, including the doctrine of equivalents.

What is claimed is:

1. A reciprocating floor conveyor system, comprising:
   at least one group of at least three floor slat members, each said floor slat member being individually mounted for longitudinal reciprocation, said floor slat members being staggered in position relative to each other between return and advanced positions;
   a separate double-acting hydraulic motor connected to each floor slat member, each said hydraulic motor including a piston head and first and second variable volume chambers on opposite sides of the piston head;
   a first source of hydraulic pressure for use in advancing the floor slat members at a predetermined rate of travel;
   a second source of hydraulic pressure for use in returning the floor slat members at a higher rate of speed than they are advanced;
   a direction valve for each hydraulic motor, each said direction valve having a first position in which the first source of hydraulic pressure fluid is connected to the first chamber of its hydraulic motor and the second chamber is connected to return pressure, and the floor slat member is advancing, and a second position in which the second source of hydraulic pressure is connected to the second chamber of said hydraulic motor, the first chamber is connected to return pressure, and the floor slat member is returning; and
   control means for said direction valves, including means for moving each direction valve from its first position to its second position substantially when its floor slat member has become fully advanced, and for moving each direction valve from its second position back to its first position substantially when its floor slat member has become fully returned.

2. A reciprocating floor conveyor system according to claim 1, wherein said control means comprises means operable in response to a first of said floor slat members becoming fully advanced to switch the direction valve for the hydraulic motor connected to said first floor slat member, from its first position to its second position, and for moving such direction valve from its second position back to its first position substantially when the first floor slat member has become fully returned.

3. A reciprocating floor conveyor system according to claim 2, wherein the direction valve for the hydraulic motor connected to said first floor slat member comprises a reciprocating valve spool member and a fluid chamber at each end of said valve spool member, and said control means further comprises a two position pilot valve having a valve spool and a valve operator, and a mechanical member movable with said first floor slat member and operable to contact and move said pilot valve operator during the end of movement of the first floor slat member in each of its directions of movement, to in that manner switch such pivot valve from one of its two positions to the other, wherein in one of its two positions the pilot valve directs fluid pressure to the fluid chamber at one end of the valve spool member for the direction valve and connects the fluid chamber at the opposite end of said spool member to return, and in its second position connects the first chamber to return and directs fluid pressure to the other chamber; and
   wherein the resulting fluid pressure differential acting on said direction valve spool member positions the direction valve spool member.

4. A reciprocating floor conveyor system according to claim 3, wherein the direction valve for each of the remaining floor slat members comprises a reciprocating two position valve plug member and spring means which normally biases such valve plug member into its first position, and fluid pressure means operable in opposition to the spring means for moving the valve plug member into its second position.

5. A reciprocating floor conveyor system according to claim 4, wherein the control means comprises a multi position second pilot valve for controlling fluid pressure to the direction valves for said remaining floor slat members, said second pilot valve including a control member connected to move with the first floor slat member, such that operation of the pilot valve and delivery of fluid via such pilot valve to the direction valves for each of the remaining floor slat members are functions of the position of the first floor slat member.

6. A reciprocating floor conveyor system according to claim 5, wherein said second pilot valve comprises an elongated cylinder, and wherein said control member for the second pilot valve comprises a piston rod, two axially spaced apart piston heads on said piston rod, defining a fluid chamber between them, and a fluid passageway extending through the piston rod and communicating with the chamber between the two piston heads; means connecting said piston rod to the first floor slat member so that when the first floor slat member is advancing the piston rod moves in a first direction through the elongated cylinder, and when the first floor slat member is retracting the piston rod member moves in the opposite direction through said elongated cylinder;

means connecting the fluid passageway in the piston rod to return during return movement of the first floor slat member and connecting fluid pressure to said fluid passageway during advance movement of the first floor slat member;

said elongated cylinder having a plurality of axially spaced apart side ports, equal in number to the said other floor slat members;

means at each end of said elongated cylinder connecting the interior of the cylinder to return; and wherein the said fluid pressure means operable in opposition to the spring means for moving the valve plug members of the direction valves for the said other floor slat members comprises a separate conduit leading from each said side port to a related one of the direction valves for the remaining floor slat members, whereby when the first floor slat member is advancing and fluid pressure is in the chamber between the two piston heads, such fluid pressure will be sequentially communicated via said side ports and said conduits to the directional valves for the remaining floor slat members, and such fluid pressure will sequentially move the valve plug members for said direction valves into their second positions, for sequentially causing return movement of the said remaining floor slat members, and during return movement of the first floor slat member the said directional valves for the remaining floor slat members will always be connected to return and the spring means for such directional valves will bias the valve plug members into their first positions, and the said remaining floor slat members will all be advancing.

7. A reciprocating floor conveyor according to claim 1, wherein the first source of hydraulic pressure is a first pump and the second source of hydraulic pressure is a second pump, and wherein the second pump is adapted to deliver fluid into the second chamber of each cylinder at a rate to cause the cylinder to move the slat member from its advance position back to its start position substantially within the time interval that it takes for the next slat member in the group to complete movement to its advanced position.

8. A reciprocating floor conveyor system according to claim 7, wherein said control means comprises means operable in response to a first of said floor slat members becoming fully advanced to switch the direction valve for the hydraulic motor connected to said first floor slat member, from its first position to its second position, and for moving such direction valve from its second position back to its first position substantially when the first floor slat member has become fully returned.

9. A reciprocating floor conveyor system according to claim 8, wherein the direction valve for the hydraulic motor connected to said first floor member comprises a reciprocating valve spool member and a fluid chamber at each end of said valve spool member, and said control means further comprises a two position pilot valve having a valve spool and a valve operator, and a mechanical member movable with said first floor slat member and operable to contact and move said pilot valve operator during the end of movement of the first floor slat member in each of its directions of movement, to in that manner switch such pivot valve from one of its two positions to the other, wherein in one of its two positions the pilot valve directs fluid pressure to the fluid chamber at one end of the valve spool member for the direction valve and connects the fluid chamber at the opposite end of said spool member to return, and in its second position connects the first chamber to return and directs fluid pressure to the other chamber; and wherein the resulting fluid pressure differential acting on said direction valve spool member positions the direction valve spool member.

10. A reciprocating floor conveyor system according to claim 9, wherein the direction valve for each of the remaining floor slat members comprises a reciprocating two position valve plug member and spring means which normally biases such valve plug member into its first position, and fluid pressure means operable in opposition to the spring means for moving the valve plug member into its second position.

11. A reciprocating floor conveyor system according to claim 10, wherein the control means comprises a multi position second pilot valve for controlling fluid pressure to the direction valves for said remaining floor slat members, said second pilot valve including a control member connected to move with the first floor slat member, such that operation of the pilot valve and delivery of fluid via such pilot valve to the direction valves for each of the remaining floor slat members are functions of the position of the first floor slat member.

12. A reciprocating floor conveyor system according to claim 11, wherein said second pilot valve comprises an elongated cylinder, and wherein said control member for the second pilot valve comprises a piston rod, two axially spaced apart piston heads on said piston rod, defining a fluid chamber between them, and a fluid passageway extending through the piston rod and communicating with the chamber between the two piston heads; means connecting said piston rod to the first floor slat member so that when the first floor slat member is advancing the piston rod moves in a first direction through the elongated cylinder and when the first floor slat member is retracting the piston rod member moves in the opposite direction through said elongated cylinder;

means connecting the fluid passageway in the piston rod to return during return movement of the first floor slat member and connecting fluid pressure to said fluid passageway during advance movement of the first floor slat member;

said elongated cylinder having a plurality of axially spaced apart side ports, equal in number to the said other floor slat members;

means at each end of said elongated cylinder connecting the interior of the cylinder to return; and wherein the said fluid pressure means operable in opposition to the spring means for moving the valve plug members of the direction valves for the said other floor slat members comprises a separate conduit leading from each said side port to a related one of the direction valves for the remaining floor slat members, whereby when the first floor slat member is advancing and fluid pressure is in the chamber between the two piston heads, such fluid pressure will be sequentially communicated via said side ports and said conduits to the directional valves for the remaining floor slat members, and such fluid pressure will sequentially move the valve plug members for said direction valves into their second positions, for sequentially causing return movement of the said remaining floor slat members, and during return movement of the first floor slat member the said directional valves for the remaining floor slat members will always be connected to return and the spring means for such directional valves will bias the valve plug members into their first positions, and the said remaining floor slat members will all be advancing.

13. A continuous conveyor comprising a group of at least three elongated slat members mounted adjacent each other, said slat members being staggered in position relative to each other, between retracted and advanced positions;
   a double-acting hydraulic cylinder for each such slot member, said double-acting hydraulic cylinder connected to its slat member for moving the same back and forth endwise between said retracted and advanced positions, each cylinder including first and second fluid chambers on opposite sides of a piston head;
   a first pump;
   a second pump;
   a separate direction valve for each cylinder, each such valve including a first position in which the first pump is connected to the first fluid chamber of the cylinder and the second fluid chamber is connected to return, and the cylinder is advancing its slot member, and a second position in which the second pump is connected to the second fluid chamber and the first fluid chamber is connected to return, and the cylinder is returning its slat member to its retracted position;
   control means for positioning said valves in their first position, to cause the slat members to advance and then individually and sequentially shifting the valve member for each cylinder into its second position as each slat member reaches its advanced position, to cause such slat member to return,
   wherein the second pump is adapted to deliver fluid into the second chamber of each cylinder at a rate to cause the cylinder to move the slat member from its advance position back to its retracted position substantially within the time interval that it takes for the next slat member in the group to complete movement to its advanced position.

14. A continuous conveyor according to claim 13, wherein a first of said slat members is provided with fluid means for shifting the direction valve associated with said slat member in position between its first and second positions, and means responsive to the first slat member reaching its advanced position, to switch the direction valve for the first slat member from its first to its second position, and means responsive to the first slat member reaching its retracted position for switching such direction valve from its second position back to its first position.

15. A continuous conveyor according to claim 14, wherein the directional valves for the remaining slat members include spring means biasing them into their first positions, and such control means comprises fluid pressure control means responsive to the position of the first floor slat member in its advance stroke, for sequentially sending fluid pressure pulses to the directional valves for said other floor slat members, for sequentially switching such directional valves from their first to their second positions.

* * * * *

UNITED STATES PATENT AND TRADEMARK OFFICE
CERTIFICATE OF CORRECTION

PATENT NO. : 4,580,678
DATED : April 8, 1986
INVENTOR(S) : Raymond K. Foster

It is certified that error appears in the above-identified patent and that said Letters Patent are hereby corrected as shown below:

Column 4, line 58, "such" should be -- each --.

Signed and Sealed this

Nineteenth Day of August 1986

[SEAL]

Attest:

Attesting Officer

DONALD J. QUIGG

Commissioner of Patents and Trademarks